United States Patent
Jain et al.

(10) Patent No.: US 9,598,076 B1
(45) Date of Patent: Mar. 21, 2017

(54) DETECTION OF LANE-SPLITTING MOTORCYCLES

(71) Applicant: Ford Global Technologies, LLC, Dearborn, MI (US)

(72) Inventors: Jinesh J. Jain, San Mateo, CA (US); Harpreetsingh Banvait, Sunnyvale, CA (US); Kyu Jeong Han, Palo Alto, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/920,369

(22) Filed: Oct. 22, 2015

(51) Int. Cl.
| | | |
|---|---|---|
| *G06F 17/10* | (2006.01) | |
| *B60W 30/09* | (2012.01) | |
| *G08G 1/16* | (2006.01) | |
| *G01S 13/93* | (2006.01) | |
| *G01S 15/93* | (2006.01) | |
| *G01S 17/93* | (2006.01) | |
| *G05D 1/00* | (2006.01) | |
| *G08G 1/017* | (2006.01) | |
| *G06K 9/00* | (2006.01) | |

(52) U.S. Cl.
CPC ............ *B60W 30/09* (2013.01); *G01S 13/931* (2013.01); *G01S 15/93* (2013.01); *G01S 17/93* (2013.01); *G05D 1/0088* (2013.01); *G08G 1/0175* (2013.01); *G08G 1/166* (2013.01); *G08G 1/167* (2013.01); *B60W 2420/42* (2013.01); *B60W 2420/52* (2013.01); *B60W 2420/54* (2013.01); *B60W 2550/20* (2013.01); *B60W 2710/18* (2013.01); *B60W 2710/20* (2013.01); *B60W 2720/106* (2013.01); *B60W 2750/00* (2013.01)

(58) Field of Classification Search
CPC ........ G06F 17/10; G08G 1/0962; G06K 9/00; G06K 9/20
USPC ..................... 701/28, 301; 348/148; 340/435
See application file for complete search history.

(56) References Cited

U.S. PATENT DOCUMENTS

| | | | |
|---|---|---|---|
| 6,330,511 B2 | 12/2001 | Ogura | |
| 6,549,124 B1 | 4/2003 | Ishikawa | |
| 7,209,221 B2 | 4/2007 | Breed | |
| 8,903,638 B2 | 12/2014 | Lin | |
| 2013/0338881 A1 | 12/2013 | Sato | |
| 2014/0278059 A1* | 9/2014 | Gunther | G01C 21/3655 701/414 |

(Continued)

FOREIGN PATENT DOCUMENTS

JP            08202999         8/1996

*Primary Examiner* — Tan Q Nguyen
(74) *Attorney, Agent, or Firm* — David R. Stevens; Stevens Law Group

(57) ABSTRACT

A controller for an autonomous vehicle received audio streams from one or more microphones and one or more image streams from one or more cameras. The audio streams are processed to identify audio features that potentially correspond to a motorcycle. The video streams are likewise processed to identify image objects that have movement and/or visual attributes corresponding to a motorcycle. The audio features and image objects are correlated. If a correlation is identified among the audio features and image objects, then a potentially lane-splitting motorcycle may be determined to be proximate. Actions may be taken to avoid collision with the lane-splitting motorcycle, such as avoiding lane changes, signaling longer, or performing lane changes more slowly.

20 Claims, 4 Drawing Sheets

(56) References Cited

U.S. PATENT DOCUMENTS

2016/0167650 A1* 6/2016 Clarke ................. B60W 30/00
                                                                             701/28

\* cited by examiner

DETECTION OF LANE-SPLITTING MOTORCYCLES

BACKGROUND

Field of the Invention

This invention relates to performing obstacle avoidance in autonomous vehicles.

Background of the Invention

In many congested, urban areas like San Francisco, Calif. or London, UK, motorcyclists often overtake slow or stopped vehicles in the traffic by traveling between lanes, namely lane-splitting. This is a very dangerous driving activity since it is hard for drivers in adjacent vehicles to detect such activities, especially when lanes are merging. Even for future autonomous vehicles, which might have built-in 360 degree sensing systems, it would be challenging to identify fast moving objects like motorcycles changing lanes at much higher relative speeds. This difficulty would hence present challenges to the overall sensing suites and algorithms. It is further problematic where objects or vehicles occlude a sensing system.

The systems and methods disclosed herein provide an improved approach for sensing motorcyclists that are lane-splitting.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
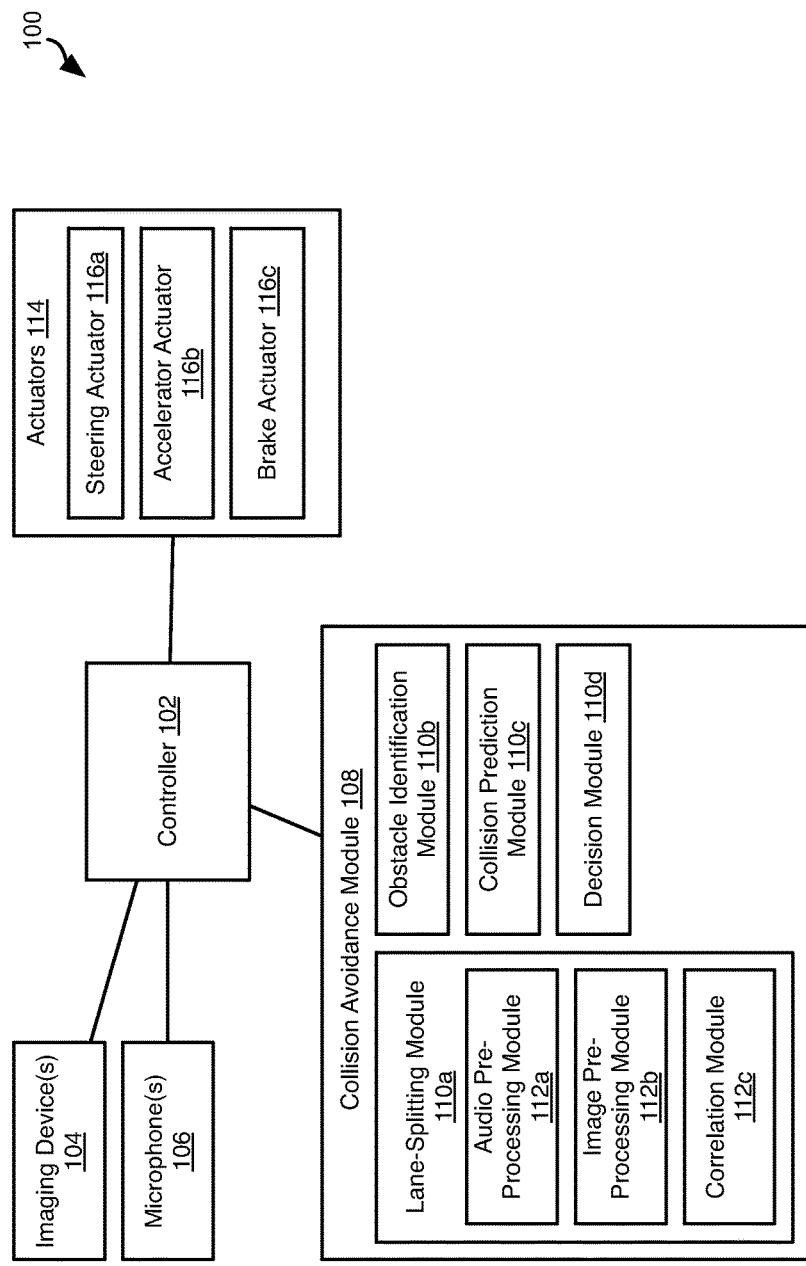
FIG. 1 is a schematic block diagram of a system for implementing embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, a controller 102 may be housed within a vehicle. The vehicle may include any vehicle known in the art. The vehicle may have all of the structures and features of any vehicle known in the art including, wheels, a drive train coupled to the wheels, an engine coupled to the drive train, a steering system, a braking system, and other systems known in the art to be included in a vehicle.

As discussed in greater detail herein, the controller 102 may perform autonomous navigation and collision avoidance. In particular, image data and audio data may be analyzed to identify motorcycles that may be lane-splitting as discussed in greater detail below with respect to FIGS. 3 and 4.

The controller 102 may receive one or more image streams from one or more imaging devices 104. For example, one or more cameras may be mounted to the vehicle and output image streams received by the controller 102. The controller 102 may receive one or more audio streams from one or more microphones 106. For example, one or more microphones or microphone arrays may be mounted to the vehicle and output audio streams received by the controller 102. The microphones 106 may include directional microphones having a sensitivity that varies with angle.

The controller 102 may execute a collision avoidance module 108 that receives the image streams and audio streams and identifies possible obstacles and takes measures to avoid them. In the embodiments disclosed herein, only image and audio data is used to perform collision avoidance. However, other sensors to detect obstacles may also be used such as RADAR, LIDAR, SONAR, and the like.

The collision avoidance module 108 may include a lane-splitting module 110a. The lane-splitting module 110a may include an audio pre-processing module 112a that is programmed to process the one or more audio streams in order to identify features that could correspond to a motorcycle. The lane-splitting module 110a may include an image pre-processing module 112b that is programmed to process the one or more image streams in order to identify images, movements, behaviors, or other visual cues that may correspond to a motorcycle, motorcyclists, or driving patterns characteristic of a motorcycle. The lane-splitting module 110a may further include a correlation module 112c that receives audio features identified by the audio pre-processing module 112a and visual cues identified by the image pre-processing module 112b and estimates some or all of the presence of a motorcyclist in proximity to the autonomous vehicle, whether the motorcyclist is lane-splitting, and the location of the motorcyclist. The function of the modules 112a-112c of the lane-splitting module 110a is described in greater detail below with respect to the method 400 of FIG. 4.

The collision avoidance module 108 may further include an obstacle identification module 110b, a collision prediction module 110c, and a decision module 110d. The obstacle identification module 110b analyzes the one or more image streams and identifies potential obstacles, including people, animals, vehicles, buildings, curbs, and other objects and structures. In particular, the obstacle identification module 110b may identify vehicle images in the image stream.

The collision prediction module 110c predicts which obstacle images are likely to collide with the vehicle based on its current trajectory or current intended path. The decision module 110d may make a decision to stop, accelerate, turn, etc. in order to avoid obstacles. The manner in which the collision prediction module 110c predicts potential collisions and the manner in which the decision module 110d takes action to avoid potential collisions may be according to any method or system known in the art of autonomous vehicles.

The decision module 110d may control the trajectory of the vehicle by actuating one or more actuators 114 controlling the direction and speed of the vehicle. For example, the actuators 114 may include a steering actuator 116a, an accelerator actuator 116b, and a brake actuator 116c. The configuration of the actuators 116a-116c may be according to any implementation of such actuators known in the art of autonomous vehicles.

Figure 2:
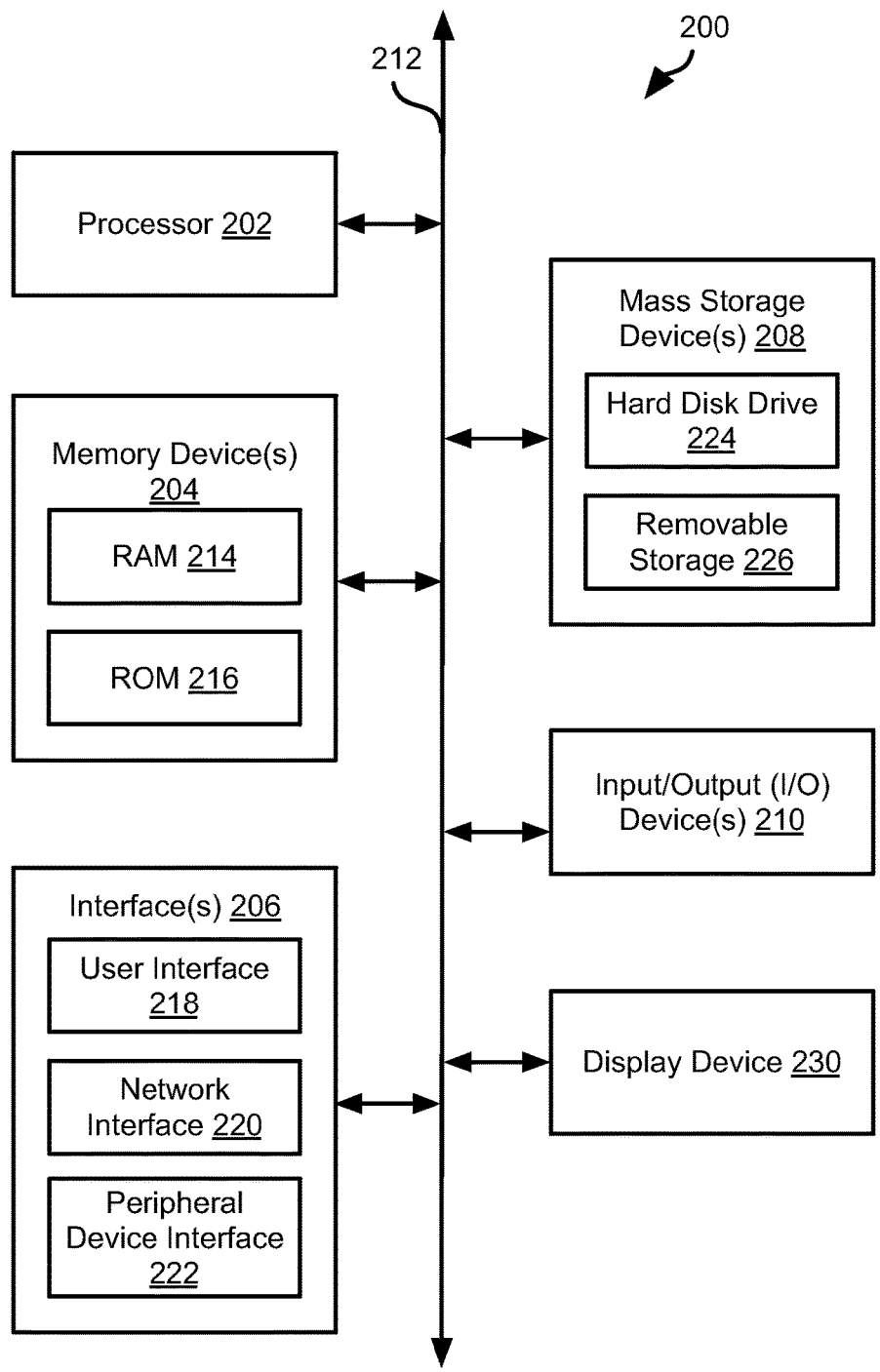
FIG. 2 is a schematic block diagram of an example computing device suitable for implementing methods in accordance with embodiments of the invention.

FIG. 2 is a block diagram illustrating an example computing device 200. Computing device 200 may be used to perform various procedures, such as those discussed herein. The controller 102 may have some or all of the attributes of the computing device 200.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more peripheral interfaces such as interfaces for pointing devices (mice, track pad, etc.), keyboards, and the like.

Bus 212 allows processor(s) 202, memory device(s) 204, interface(s) 206, mass storage device(s) 208, I/O device(s) 210, and display device 230 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
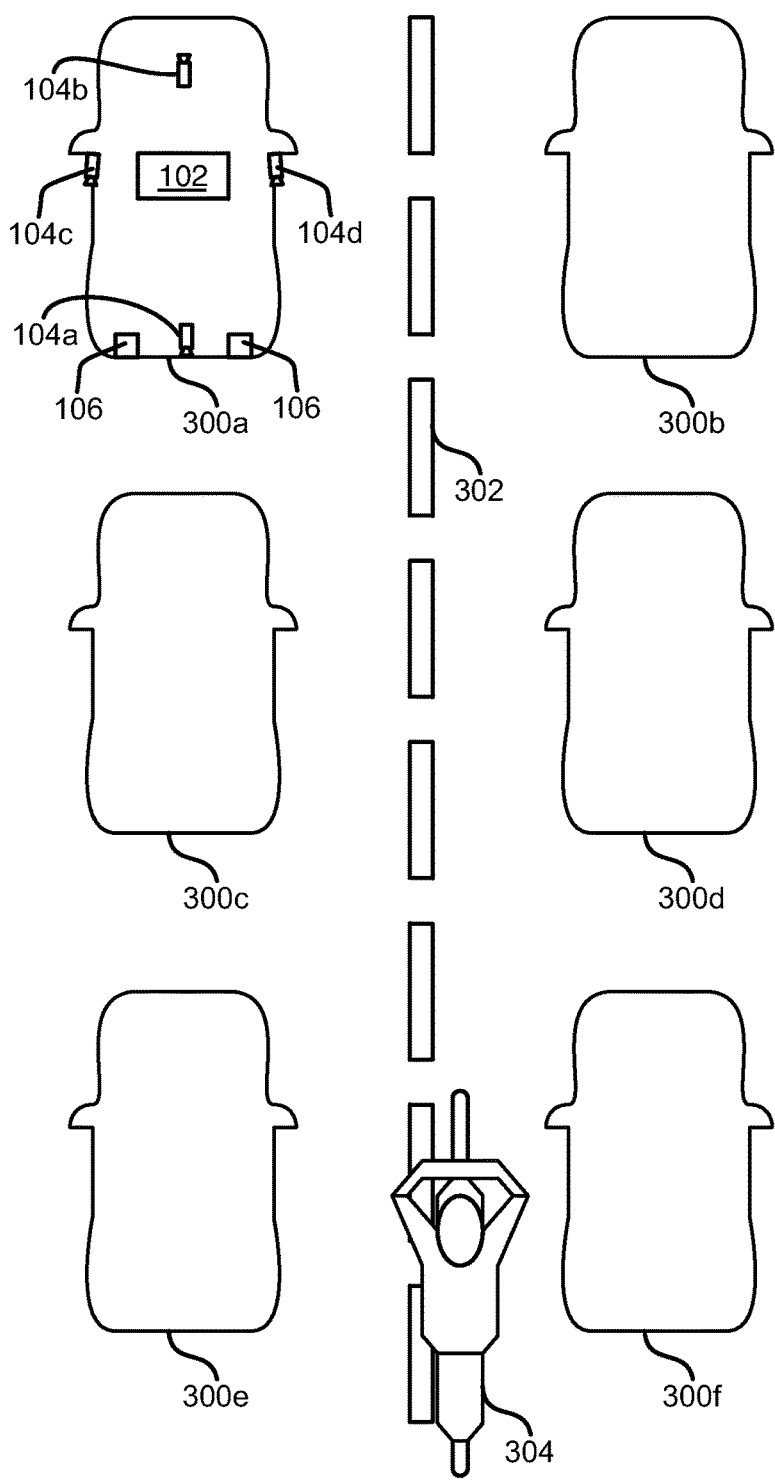
FIG. 3 is a schematic diagram illustrating an autonomous vehicle in traffic including a lane-splitting motorcyclist.

Turning now to FIG. 3, vehicles 300a-300f in multi-lane traffic may travel in lanes on either side of a dividing line 302 between the lanes. A motorcyclist 304 may travel between the lanes, e.g. on or about the dividing line 302. The motorcyclist 304 will typically travel faster than the other vehicles 300a-300f and provides little time to react. Furthermore, where the vehicles 300a-300f are moving slowly, the gaps between them may be small and visibility behind each vehicle may be limited as a result.

In FIG. 3, vehicle 300a includes the controller 102 housed therein as well as imaging devices 104 and microphones 106 mounted thereto. As shown, the imaging devices 104 may include a rear facing camera 104a, such as conventional back-up camera. A forward facing camera 104b may be mounted to the vehicle 300a. The illustrated embodiment further includes lateral cameras 104c, 104d mounted to sides of the vehicle 300a, such as to the front doors proximate the side mirrors or mounted to the side mirrors themselves. The lateral cameras 104c, 104d may have an optical axis that is angled relative to the longitudinal axis (front to back) of the vehicle 300a in order to provide a broader field of view.

The microphones 106 may be mounted to a rear of the vehicle. Each microphone 106 shown may be an individual microphone or array of microphones. The microphones 106 may be directional microphones that are sensitive to sounds originating within a limited angular range. The microphones 106 shown are located at opposite sides of the vehicle 300a in order to enable estimation of the direction from which a detected sound originated. In some embodiments, the microphones 106 may include a microphone located in the cabin of the vehicle, such as a microphone used for detecting voice commands or enabling hands-free telephone calls.

Figure 4:
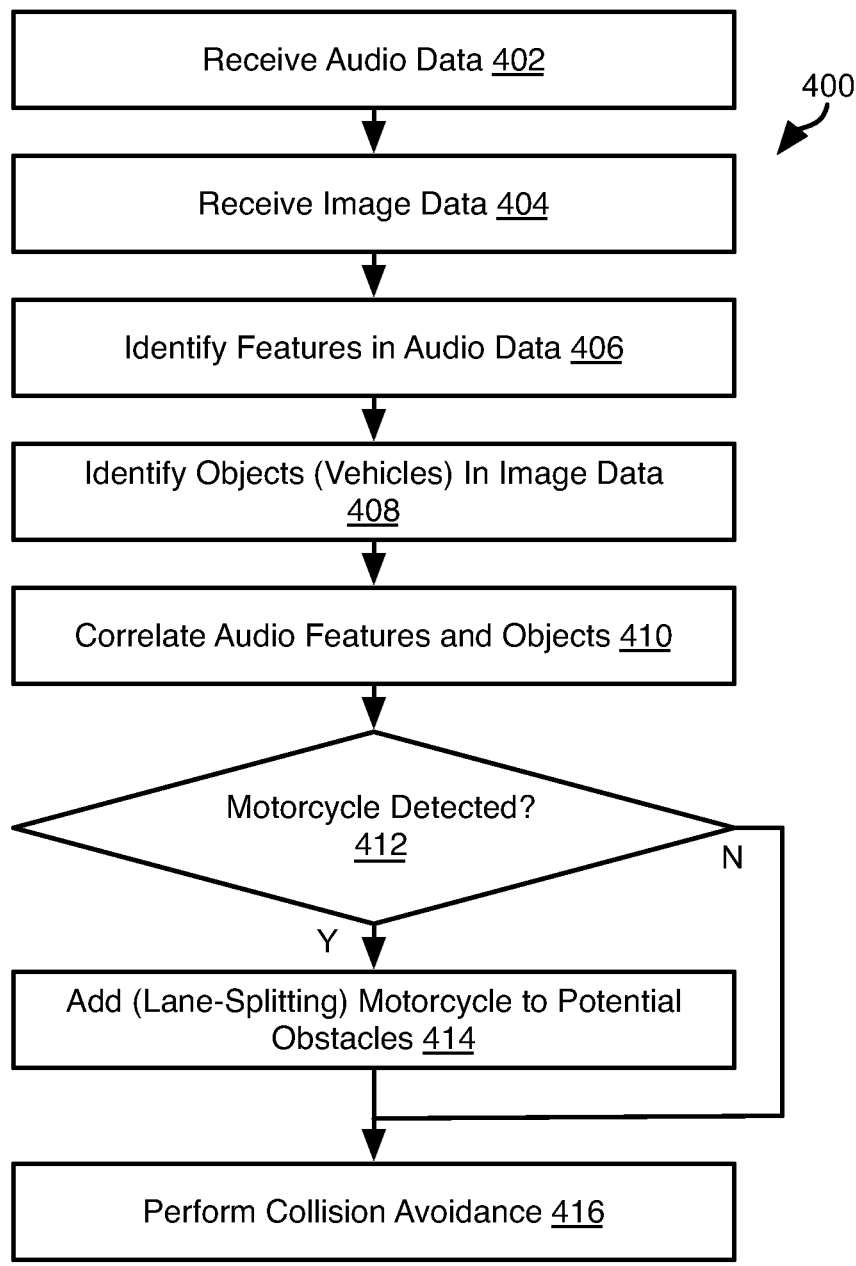
FIG. 4 is a process flow diagram of a method for detecting lane-splitting motorcyclists in accordance with an embodiment of the invention.

Referring to FIG. 4, the illustrated method 400 may be executed by the controller 102 in order to provide enhanced collision avoidance with respect to motorcyclists. For example, the illustrated method 400 may be executed by the collision avoidance module 108 and the lane-splitting module 110a thereof The method 400 may include receiving 402 audio data, such as in the form of audio streams from the one or more microphones 106. The audio streams may be analog or digital streams and may be filtered or otherwise processed to remove noise. The method 400 may include receiving 404 image data, such as in the form of image streams from one or more cameras 104. The image streams may be in the form of a video signal according to any video encoding and transmitting protocol known in the art. Alternatively, each image stream may simply be a series of individual images according to any image format known in the art received in the order in which they were taken by one of the cameras 104.

The method 400 may include identifying 406 features in the audio data. In particular, audio streams may be filtered, analyzed, and otherwise processed in the time domain or frequency domain to identify or accentuate motorcycle-specific audio features that are likely generated by a motorcycle. Audio features may be short or long segments of the audio signal that include sounds likely generated by a motorcycle, particularly engine noise. Identifying 406 features in an audio signal may include filtering the audio signal in one or both of the time and frequency domain such that the output of the filtering is sounds that likely originated from a motorcycle. For example, motorcycles (and motorcycle engines) may have a characteristic frequency band. Accordingly, the audio stream may be bandpass, or otherwise filtered, such that only sounds within that frequency band remain. In many instances, sounds of a motorcycle will be detected along with engine and road noise from other vehicles resulting in a low signal-to-noise ratio (SNR). However, given the distinctive audio characteristics of motorcycles, the audio features corresponding to a motorcycle may be isolated at step 406.

The method 400 may further include identifying 408 objects, particularly vehicles, in the image data. For example, identifying 408 objects may include performing image recognition to identify images of motorcycles or motorcyclists. Identifying 408 objects may include performing video filtering on an image stream in one or both of the time domain and spatial domain. For example, an image stream may be analyzed to identify fast moving objects. In particular, when lane splitting occurs, the vehicle may be moving at the same speed as other four (or more) wheeled vehicles, i.e. slowly. In such situations, a motorcyclist is likely to perform lane splitting and will likely be traveling much faster than the other vehicles. Accordingly, the image stream is analyzed to identify fast moving objects. For example, identifying 408 objects may include identifying a set of objects that are moving at a speed relative to the vehicle 300a that exceeds some threshold. Identifying 408 objects may include identifying objects that are moving at a relative speed exceeding some threshold in a particular direction, i.e. parallel to the longitudinal (front to back) axis of the vehicle 300a.

The method 400 may further include correlating 410 audio features and image objects identified at steps 406, 408. For example, features identified in multiple audio streams may be analyzed to determine a direction to the source of the features. For example, the same feature may be detected by multiple microphones at different times and intensities. The fact that a feature in multiple audio streams emanated from the same source at the same time may be determined by determining that the features are highly correlated, e.g. the correlation function of the two features exceeds some threshold. The direction may be determined from a known separation between the microphones 106 that detected the highly correlated features.

The direction to the source of a feature may be correlated to a location of an object identified at step 408, i.e. an object located within some threshold angular region from the direction to the feature may be deemed to be correlated to that feature. Correlating at step 410 may include performing temporal correlation. For example, it may be determined whether a period of within which an audio feature was detected corresponds to a time period within which the images were detected in which an image object was found.

Accordingly, correlating audio features and image objects may include identifying pairs of audio features and image objects that are one or both of temporally and spatially correlated. For example, an audio feature and image object that are temporally correlated may have a score that increases with the degree of spatial correlation therebetween, i.e. how closely the direction to the source of the audio feature corresponds to the location of the image object. Where the score exceeds some threshold, the audio feature and image object may be deemed correlated and therefore likely correspond to a motorcycle.

In some embodiments, correlating 410 audio features and image objects may be performed using a machine-learning algorithm. For example, a model may be trained by detecting sounds from a motorcycle by an array of microphones 106 and cameras 104 having relative positions similar to the vehicle 300a, where the speed and location of the motorcycle is known. The model may then be trained using machine learning techniques to relate features and image objects detected using the microphones 106 and cameras 104 to the presence of a motorcycle and/or the location of a motorcycle.

Correlating audio features and image objects may then include inputting them to the model, which will then output whether the audio features and image objects correspond to a motorcycle and/or the likely position of a motorcycle that corresponds to the audio features and image objects.

If the correlation step 410 is found 412 to indicate that a motorcycle is proximate, then a possibly lane-splitting motorcycle is added 414 to a set of potential obstacles. The set of potential obstacles may include other obstacles detected using the imaging devices 104 or any other sensors using any algorithm known in the art.

The method 400 may include performing 416 collision avoidance with respect to the obstacle set, which may include a likely lane-splitting motorcycle identified according to steps 406-412. Where the obstacle set includes a possible lane-splitting motorcycle, performing collision avoidance may include performing fewer lane changes, signaling longer prior to lane changes, performing lane changes more slowly, or otherwise driving differently than when a possible lane-splitting motorcycle is not detected.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A controller for an autonomous vehicle comprising:
one or more processing devices programmed to
receive one or more image streams;
receive one or more audio streams;
identify a plurality of vehicle images in the one or more image streams;
identify a plurality of audible features in the one or more audio streams; and
identify a potential lane-splitting motorcycle by correlating the plurality of vehicle images and the plurality of audible features.

2. The controller of claim 1, wherein the one or more processing devices are further programmed to receive environmental information from one or more of one or more cameras, RADAR sensors, LIDAR sensors, and SONAR sensors.

3. The controller of claim 2, wherein the one or more processing devices are further programmed to:
in response to identifying the potential lane-splitting motorcycle, avoid causing the autonomous vehicle to make lane changes.

4. The controller of claim 1, wherein the one or more processing devices are further programmed to:
identify one or more audible features in the one or more audio streams, the one or more audible features having a motorcycle-specific sound pattern;
identify among the plurality of vehicle images, motorcycle-specific image patterns;
attempt to correlate the one or more audible features and the one or more image patterns;
if the one or more audible features and the one or more image patterns are correlated, augment a confidence score that the potential lane-splitting motorcycle is a potential obstacle.

5. The controller of claim 4, wherein the one or more processing devices are programmed to attempt to correlate the one or more audible features and the one or more image patterns by inputting the one or more audible features and one or more image patterns to a machine learning algorithm.

6. The controller of claim 5, wherein the one or more processing devices are further programmed to identify among the plurality of vehicle images, motorcycle-specific image patterns comprises identifying objects exhibiting motorcycle-specific movement among the plurality of vehicle images.

7. The controller of claim 5, wherein the one or more processing devices are further programmed to identify the one or more audible features by filtering the one or more audio streams to obtain a filtered signal including the one or more audible features.

8. The controller of claim 1, further comprising a microphone array coupled thereto, the microphone array configure to generate the one or more audio streams.

9. The controller of claim 1, further comprising at least one microphone coupled configured to generate the one or more audio streams, the at least one microphone located within a cabin of the autonomous vehicle.

10. The controller of claim 1, further comprising one or more cameras configured to generate the one or more images streams, the one or more cameras coupled to the autonomous vehicle and oriented rearwardly relative to the autonomous vehicle.

11. A method for collision avoidance comprising:
receiving, by a controller of an autonomous vehicle, one or more image streams;
receiving, by the controller, one or more audio streams;
identifying, by the controller, a plurality of vehicle images in the one or more image streams;
identifying, by the controller, a plurality of audible features in the one or more audio streams; and
identifying, by the controller, a potential lane-splitting motorcycle by correlating the plurality of vehicle images and the plurality of audible features.

12. The method of claim 11, further comprising:
identifying, by the controller, a set of potential obstacles among the plurality of vehicle images, the set of potential obstacles including the potential lane splitting motorcycle;
evaluating, by the controller, possible collisions between the autonomous vehicle and the set of potential obstacles; and
activating, by the controller, at least one of a steering actuator, accelerator actuator, and brake actuator of the autonomous vehicle effective to avoid collisions with the set of potential obstacles.

13. The method of claim 12, further comprising:

in response to identifying the potential lane-splitting motorcycle, avoiding, by the controller, causing the autonomous vehicle to make lane changes.

14. The method of claim 11, further comprising:

(a) identifying, by the controller, one or more audible features in the one or more audio streams, the one or more audible features having motorcycle-specific sound patterns;

(b) identifying, by the controller, among the plurality of vehicle images, image patterns characteristic of a motorcycle;

(c) attempting, by the controller, to correlate the one or more audible features and the one or more image patterns;

in response to the attempt of (c) being successful, augmenting, by the controller, a confidence score that the potential lane-splitting motorcycle is a potential obstacle.

15. The method of claim 14, wherein attempting to correlate the one or more audible features and the one or more image patterns comprises inputting the one or more audible features and one or more image patterns to a machine learning algorithm.

16. The method of claim 15, wherein identifying among the plurality of vehicle images, motorcycle-specific image patterns comprises identifying objects exhibiting motorcycle-specific movement among the plurality of vehicle images.

17. The method of claim 15, wherein identifying the one or more audible features comprises filtering the one or more audio streams to obtain a filtered signal including the one or more audible features.

18. The method of claim 11, wherein receiving the one or more audio streams comprises receiving the one or more audio streams from a microphone array.

19. The method of claim 11, wherein receiving the one or more audio streams comprises receiving the one or more audio streams from least one microphone coupled located within a cabin of the autonomous vehicle.

20. The method of claim 11, wherein receiving the one or more images streams comprises receiving the one or more image streams from one or more cameras coupled to the autonomous vehicle and oriented rearwardly relative to the autonomous vehicle.

* * * * *